United States Patent
Choi

(10) Patent No.: US 12,156,124 B2
(45) Date of Patent: Nov. 26, 2024

(54) ELECTRONIC DEVICE AND METHOD FOR REGISTERING THEREOF

(71) Applicant: LG ELECTRONICS INC., Seoul (KR)

(72) Inventor: Soo Young Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 168 days.

(21) Appl. No.: 17/409,899

(22) Filed: Aug. 24, 2021

(65) Prior Publication Data

US 2022/0070763 A1     Mar. 3, 2022

(30) Foreign Application Priority Data

Aug. 27, 2020    (KR) ........................ 10-2020-0108801

(51) Int. Cl.
*H04W 48/16*      (2009.01)
*H04W 48/14*      (2009.01)
(Continued)

(52) U.S. Cl.
CPC ........... *H04W 48/16* (2013.01); *H04W 48/14* (2013.01); *H04W 60/00* (2013.01); *H04W 76/10* (2018.02)

(58) Field of Classification Search
CPC ..... H04W 48/16; H04W 48/14; H04W 60/00; H04W 76/10; H04W 84/12; H04W 88/04;
(Continued)

(56) References Cited

U.S. PATENT DOCUMENTS

| 11,405,789 | B1* | 8/2022 | Wei | ........................ H04W 60/00 |
| 2010/0115067 | A1* | 5/2010 | Brant | ................... H04L 61/5092 709/221 |

(Continued)

FOREIGN PATENT DOCUMENTS

| EP | 3641228 | 4/2020 |
| KR | 10-2013-0013238 | 2/2013 |

(Continued)

OTHER PUBLICATIONS

European Search Report dated Jan. 19, 2022 issued in Application No. 21193060.7.

*Primary Examiner* — Benjamin H Elliott, IV
*Assistant Examiner* — Yewon Kim
(74) *Attorney, Agent, or Firm* — KED & Associates LLP

(57) ABSTRACT

A method for registering an electronic device in one embodiment includes broadcasting access information of an electronic device to be registered, receiving a request for communication connection based on the broadcast access information of the electronic device from a user terminal, transmitting a request for confirmation of a device corresponding to the received request for communication connection to the user terminal, receiving device confirmation information from the user terminal as a result of manipulation of a user, generating device authentication information based on the confirmation information, receiving access point (AP) access information from the user terminal, performing communication connection with an electronic-device managing server based on the received AP access information while transmitting identification information of the electronic device, and requesting registration of the device in a user account stored in the electronic-device managing server based on the transmitted identification information of the electronic device.

10 Claims, 19 Drawing Sheets

(51) Int. Cl.
*H04W 60/00* (2009.01)
*H04W 76/10* (2018.01)

(58) Field of Classification Search
CPC ......... H04W 4/70; H04W 8/08; H04W 12/06;
H04W 12/55; H04W 12/73; H04L
63/0853; H04L 12/2807; H04L 12/282;
H04L 12/283; H04L 2012/2841; G06F
21/44
See application file for complete search history.

(56) References Cited

U.S. PATENT DOCUMENTS

| | | | |
|---|---|---|---|
| 2013/0173811 | A1 | 7/2013 | Ha et al. |
| 2014/0156081 | A1 | 6/2014 | Ha |
| 2016/0072839 | A1* | 3/2016 | Mortimore, Jr. .... H04L 63/0876 726/1 |
| 2017/0269563 | A1 | 9/2017 | Ha |
| 2018/0159855 | A1* | 6/2018 | Ha .......................... G06F 21/35 |
| 2019/0163145 | A1 | 5/2019 | Ha |
| 2020/0107379 | A1 | 4/2020 | Ha et al. |
| 2020/0184952 | A1* | 6/2020 | Kwon ................... G10L 15/005 |
| 2021/0365956 | A1* | 11/2021 | No ......................... G06Q 10/20 |
| 2021/0377047 | A1* | 12/2021 | Haque ................... H04L 9/3268 |
| 2022/0029848 | A1* | 1/2022 | Ju ......................... H04L 12/282 |

FOREIGN PATENT DOCUMENTS

| | | |
|---|---|---|
| KR | 10-2013-0080487 | 7/2013 |
| KR | 10-2018-0016022 | 2/2018 |

* cited by examiner

ELECTRONIC DEVICE AND METHOD FOR REGISTERING THEREOF

CROSS-REFERENCE TO RELATED APPLICATION

This application claims priority to and the benefit of Korean Patent Application No. 10-2020-0108801, filed on Aug. 27, 2020, the disclosure of which is incorporated herein by reference in its entirety.

TECHNICAL FIELD

Disclosed herein are an electronic device and a method for registering an electronic device.

BACKGROUND

Internet of Things (IoT) technologies denote intelligence technologies and services that connect all things based on the Internet, i.e., a network and that enable mutual communication between a human and a thing and between a thing and a thing based on information.

The IoT technologies are further advanced than the wired communication-based Internet or mobile Internet. Electronic devices, to which the IoT technologies are applied, can be connected through a network and perform their own functions under users' remote control. The IoT technologies seem to be similar to existing intelligence communication between things, e.g., M2M (Machine to Machine) communication. However, the M2M communication is mainly intended for communication between communication equipment and a user. The IoT technologies allow electronic devices, connected through a network, to interact with all the information in the real world and virtual world as well as things.

In recent years, the IoT technologies have served as a platform for smart home appliances. The IoT technologies enable various types of electronic devices, such as a refrigerator, a washing machine, an air conditioner and the like in a house, to connect through a network and allow a user to remotely control each of the electronic devices or ascertain an operation state of each of the electronic devices in real time.

To control the electronic devices in a house using the IoT technologies, the electronic devices to be controlled need to be registered on a network through a terminal for control, e.g., a mobile terminal such as a smartphone. As a related art concerning the IoT technologies, an artificial intelligence home appliance network system and a method for operating the same are disclosed in Korean Patent Publication No. 10-2018-0016022.

FIG. 1 shows a configuration of a network between an electronic device, to which the IoT technologies of the related art are applied, and a user terminal.

As illustrated in FIG. 1, a user can remotely control an electronic device 102 (e.g., an air conditioner or a washing machine) in a house, or can confirm an operation state of the electronic device 102 in real time using a user terminal 104 (e.g., a mobile terminal or a tablet).

Specifically, the user executes an application for managing an electronic device 102, installed on the user terminal 104, and inputs an instruction for controlling the electronic device 102 or requests an inquiry into information on an operation state of the electronic device 102. The user terminal 104 transmits a control instruction to an electronic-device managing server 108 or requests transmission of information on the electronic device 102 at the request of the user.

The electronic-device managing server 108 communicates with the electronic device 102 through an access point (AP) 106 installed in a house. The electronic-device managing server 108 delivers the control instruction input by the user to the electronic device 102 through the AP 106 or requests the electronic device 102 to transmit the information on the operation state of the electronic device 102. The electronic device 102 is controlled under the control instruction input by the user, or transmits the information on the operation state of the electronic device 102 to the electronic-device managing server 108 through the AP 106.

The electronic-device managing server 108 transmits the received information on the operation state of the electronic device 102 to the user terminal 104. Through the above process, the user can remotely control the electronic device 102 or confirm the information on the operation state of the electronic device 102 in real time using the user terminal 104.

To carry out the above process of managing the electronic device 102, the electronic device 102 needs to be registered in the electronic-device managing server 108 as a device to be managed by the user. For the user to manage the electronic device 102 through the application for managing an electronic device 102, a procedure of registering the electronic device 102 in the electronic-device managing server 108 as a device to be managed needs to be performed first.

FIGS. 2 to 9 respectively show a screen on a display of a user terminal during a process of registering an electronic device in the related art. In the embodiment of FIGS. 2 to 9, a standing air conditioner is given as an example of an electronic device 102 to be registered by a user.

As a result of execution of the application for managing an electronic device 102 by the user, an initial screen, as illustrated in FIG. 2, is displayed on the display of the user terminal 104. The user presses a registration button 202 to register the electronic device 102.

As a result of the pressing of the registration button 202 on the initial screen in FIG. 2 by the user, a product selection screen, as illustrated in FIG. 3, is displayed on the display of the user terminal 104. A product group (e.g., an air conditioner/air care, an IoT hub) is displayed on the product selection screen. As a result of selection of any one (e.g., an air conditioner/air care) in the product group by the user, a product family (e.g., a wall-mounted air conditioner, a standing air conditioner, a split system air conditioner, an air cleaner, and a dehumidifier) included in the selected product group is displayed. In the embodiment of FIG. 3, the user selects the product group of air conditioner/air care 204, to which the electronic device 102 to be registered belongs, and then selects the product family of standing air conditioner 205, to which the electronic device 102 belongs.

As a result of the selection of the product family of the electronic device 102 to be registered by the user, a screen for requesting confirmation of product features of the electronic device 102 is displayed on the display of the user terminal 104 to confirm a product model of the electronic device 102 to be registered, as illustrated in FIG. 4. In the related art, products that belong to the same product family but belong to different product models have different features. For example, a standing air conditioner that belongs to the product family of standing air conditioner and a product model A is provided with a Wi-Fi button on a control panel of a front surface thereof while a standing air conditioner that belongs to the product family of standing air conditioner and a product model B is not provided with a Wi-Fi button on a control panel of a front surface thereof. The user checks whether the Wi-Fi button is disposed on the control panel of the front surface of the electronic device 102, and if so, the user presses a Yes button 207, and if not, presses a No button 208.

In the embodiment of FIG. 4, when the Wi-Fi button is confirmed on the control panel of the front surface of the electronic device 102 and the Yes button 207 is pressed by the user, the display of the user terminal 104 displays a guide message saying "Press the Wi-Fi button for three seconds". When the No button 208 is pressed by the user, the display of the user terminal 104 displays another guide message as in FIG. 5.

The user presses a specific button of a remote controller according to the guide message in FIG. 5, and then checks whether the "Wi-Fi" icon flickers. The user presses a Yes button 209 or a No button 210 depending of results of the check.

As a result of activation of a Wi-Fi function of the electronic device 102 by the user according to the above guide message, the electronic device 102 operates as a soft AP for communication connection with the user terminal 104. Accordingly, the electronic device 102 broadcasts its service set identifier (SSID) for communication connection.

The user activates the Wi-Fi function of the user terminal 104 according to the guide message on the screen illustrated in FIG. 6, and inputs the SSID and a password of the electronic device 102. Accordingly, the user terminal 104 performs communication connection with the electronic device 102, and as a result, the user terminal 104 and the electronic device 102 can communicate mutually.

Then the user inputs an SSID 212 and a password 214 of the AP 106 in a house respectively according to the guide message on the screen in FIG. 7. As a result of pressing of a connection button 216 by the user, the SSID 212 and password 214 of the AP 106, input by the user, is transmitted to the electronic device 102, and the electronic device 102 performs communication connection with the AP 106 based on the received SSID 212 and password 214 of the AP 106.

As a result of completion of the electronic device 102's communication connection with the AP 106, the electronic device 102 performs communication connection with the electronic-device managing server 108 through the AP 106, and requests the electronic-device managing server 108 to register the electronic device 102 as an electronic device to be managed. While the electronic device 102 performs a communication connection with the electronic-device managing server 108 and a registration request, a registration progress rate is displayed on the screen of the use terminal 104, as illustrated in FIG. 8.

Having received the request for registration from the electronic device 102, the electronic-device managing server 108 registers the electronic device 102 in the user's account as an electronic device to be managed with reference to information (e.g., a product model, specifications and the like) on the electronic device 102, transmitted by the electronic device 102.

After completion of the registration, the initial screen is displayed again on the display of the user terminal 104, as illustrated in FIG. 9. In this case, an inquiry tab 218 for inquiring into information on the electronic device registered or controlling the electronic device registered is displayed on the initial screen. The inquiry tab 218 displays a power button 220 for powering on or off the electronic device 102 and an operation state of the electronic device 102 respectively.

In the related art described with reference to FIGS. 2 to 9, complex and various procedures are required to register the electronic device 102 in the electronic-device managing server 108, causing inconvenience to the user. In the related art, the user needs to directly confirm features of the electronic device 102 and directly input various types of information through the user terminal 104 during the confirmation of product features (FIGS. 3 to 5), the communication connection (FIGS. 6 and 7), and the like. Due to the complex and various procedures, the registration of the electronic device 102 causes inconvenience and difficulty to the user. Additionally, some users (e.g., the elderly) can have difficulty in manipulating the user terminal 104.

Further, in the related art, for the user terminal 104 to perform communication connection with the electronic device 102, access information (e.g., an SSID and a password) of the electronic device 102 needs to be broadcast as a result of additional manipulation of the user. Specifically, during the additional manipulation for broadcasting the access information of the electronic device 102, the user needs to directly confirm features of the electronic device 102 such as a product name or a product version and the like of the electronic device 102.

Thus, the user can find it difficult and inconvenient to confirm the features of the electronic device 102. Furthermore, when the user checks the features of the electronic device 102 incorrectly, the registration of the electronic device 102 fails.

SUMMARY

Technical Problem

The objective of the present disclosure is to allow a user to register an electronic device in an account of the user as an electronic device to be managed only with a simple manipulation and small number of manipulations by broadcasting access information of the electronic device constantly.

The objective of the present disclosure is to automatically detect a service set identifier (SSID) of a device to be registered without an additional manipulation of a user and enable communication connection readily between an electronic device and a user terminal despite a user's lack of knowledge about features of an electronic device.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solution

A method for registering an electronic device in one embodiment may include broadcasting access information of an electronic device to be registered including device information of the electronic device to be registered, receiving a request for communication connection based on the broadcast access information of the electronic device from a user terminal, transmitting a request for confirmation a device corresponding to the received request for communication connection to the user terminal, receiving device confirmation information from the user terminal as a result of manipulation of a user, generating device authentication information based on the confirmation information, receiving access point (AP) access information from the user terminal, performing communication connection with an electronic-device managing server based on the received AP access information while transmitting identification information of the electronic device, and requesting registration of the device in a user account stored in the electronic-device managing server based on the transmitted identification information of the electronic device.

The device information of an electronic device to be registered in one embodiment may include information on an operation mode, product family, model name and identification number of an electronic device to be registered, and the identification number may be differently set for each device to be registered.

The operation mode in one embodiment may include an AT mode and an AD mode, and broadcasting access information of an electronic device may include operating in the AT mode and then when preset conditions are satisfied, operating in the AD mode for a predetermined period of time.

Transmitting a request for confirmation of a device corresponding to the received request for communication connection to the user terminal in one embodiment may further include generating a confirmation signal while transmitting a request for confirmation of a device to the user terminal.

Receiving device confirmation information as a result of manipulation of the user in one embodiment may include receiving device confirmation information based on the user's button input of the generated confirmation signal.

An electronic device in one embodiment may include a wireless communicator configured to broadcast access information of an electronic device to be registered including device information of the electronic device to be registered, and to receive a request for communication connection based on the broadcast access information of the electronic device from a user terminal, a device authenticator configured to transmit a request for confirmation of a device corresponding to the received request for communication connection to the user terminal, to receive device confirmation information from the user terminal as a result of manipulation of a user, and to generate device authentication information based on the confirmation information, and a data manager configured to receive AP access information from the user terminal, to transmit identification information of the electronic device through the wireless communicator based on the received AP access information, to perform communication connection with an electronic-device managing server, and to request registration of the device in a user account stored in the electronic-device managing server based on the transmitted identification information of the electronic device.

The device information of an electronic device to be registered in one embodiment may include information on an operation mode, product family, model name and identification number of an electronic device to be registered, and the identification number may be differently set for each device to be registered.

The operation mode in one embodiment may include an AT mode and an AD mode, and the wireless communicator may operate in the AT mode and then when preset conditions are satisfied, operate in the AD mode for a predetermined period of time.

The electronic device in one embodiment may further include a display configured to generate a confirmation signal when the request for confirmation of a device is transmitted to the user terminal.

Receiving device confirmation information from the user terminal as a result of manipulation of the user in one embodiment may include receiving device confirmation information based on the user's input of the generated confirmation signal using a button on the display.

According to the present disclosure, a user may register an electronic device in an account of the user as an electronic device to be managed only with a simple manipulation and small number of manipulations by broadcasting access information of the electronic device constantly.

According to the present disclosure, an SSID of a device to be registered may be automatically detected without an additional manipulation of a user, and communication connection may be readily performed between an electronic device and a user terminal despite a user's lack of knowledge about features of an electronic device.

BRIEF DESCRIPTION OF DRAWING

The accompanying drawings constitute a part of the specification, illustrate one or more embodiments in the disclosure, and together with the specification, explain the disclosure, wherein.

DETAILED DESCRIPTION

Figure 1:
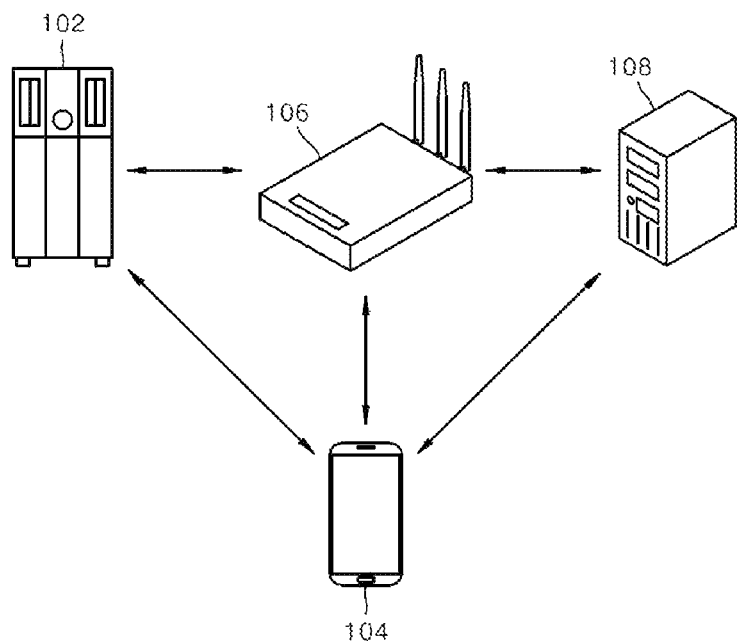
FIG. 1 shows a configuration of a network between an electronic device, to which IoT technologies of the related art are applied, and a user terminal.
Figure 2:
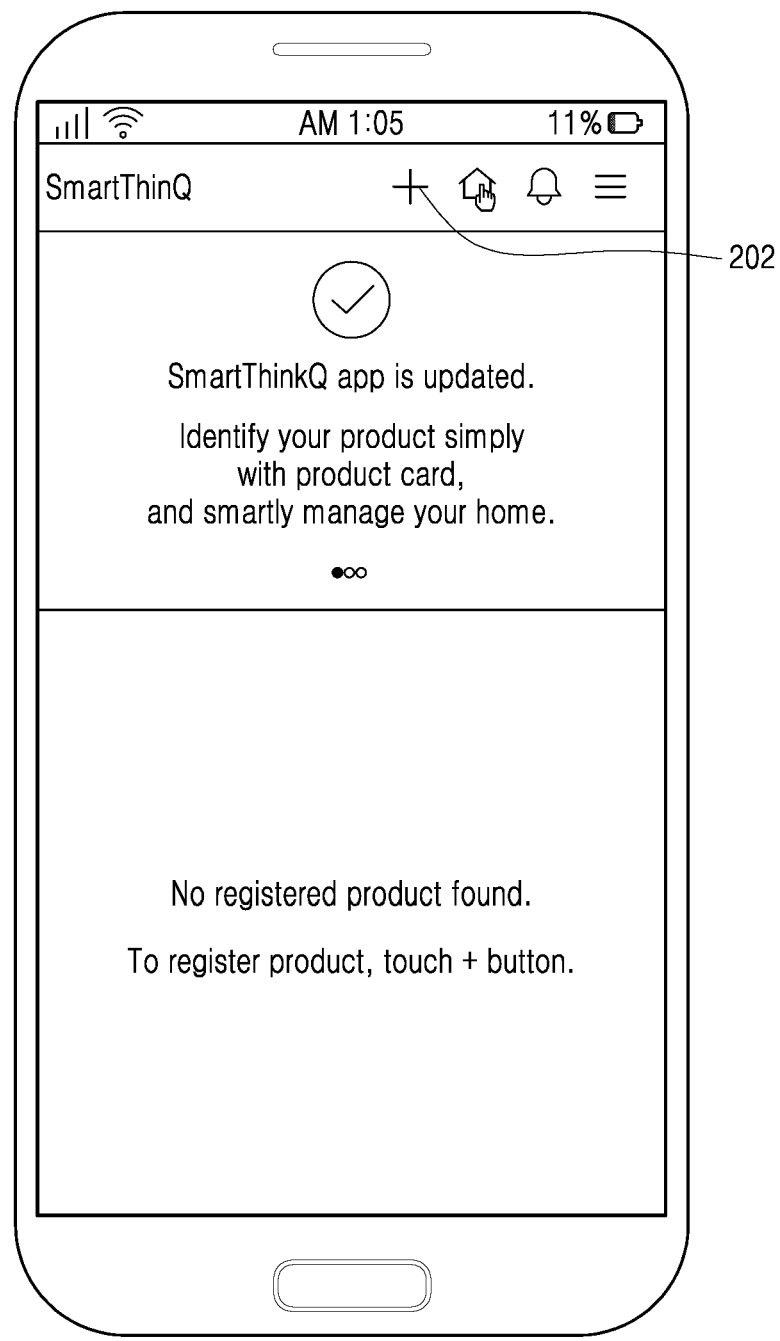
FIGS. 2 to 9 respectively show a screen on a display of a user terminal during a process of registering an electronic device in the related art.
Figure 3:
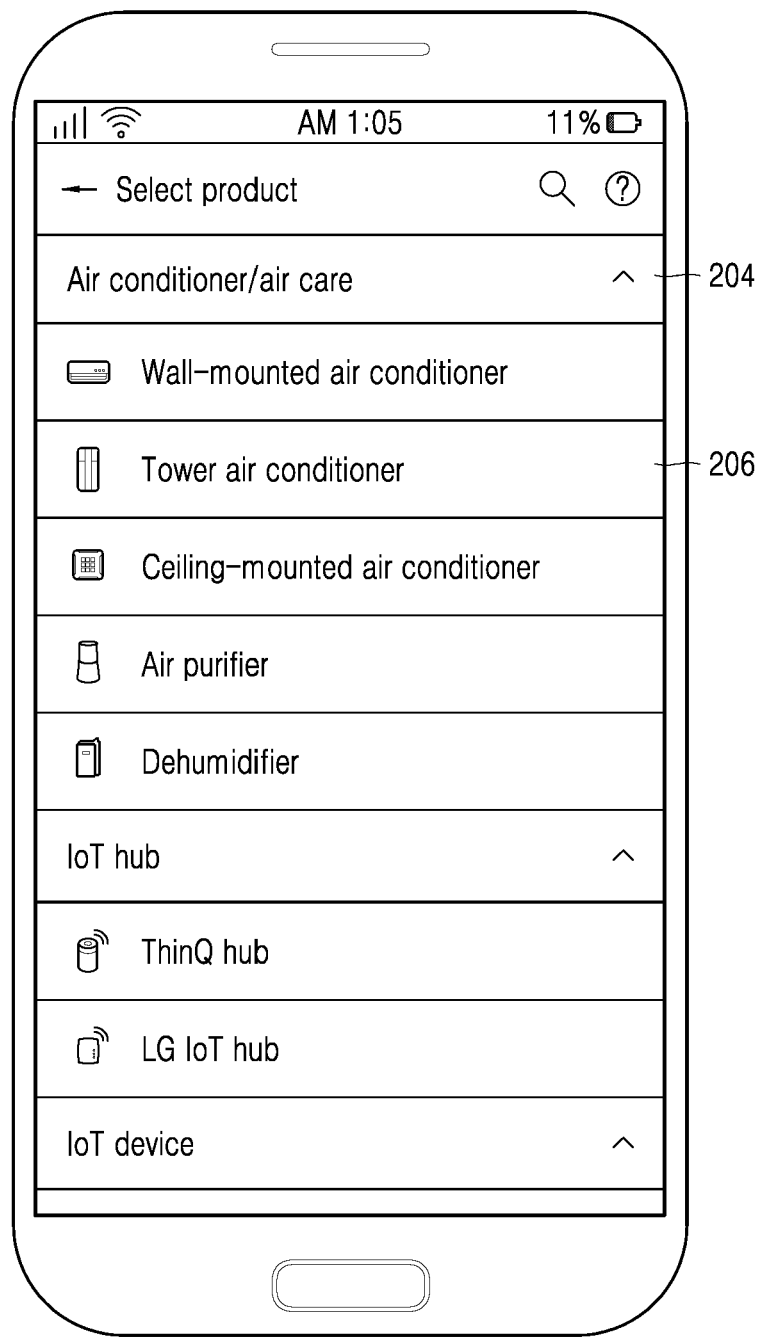
Figure 4:
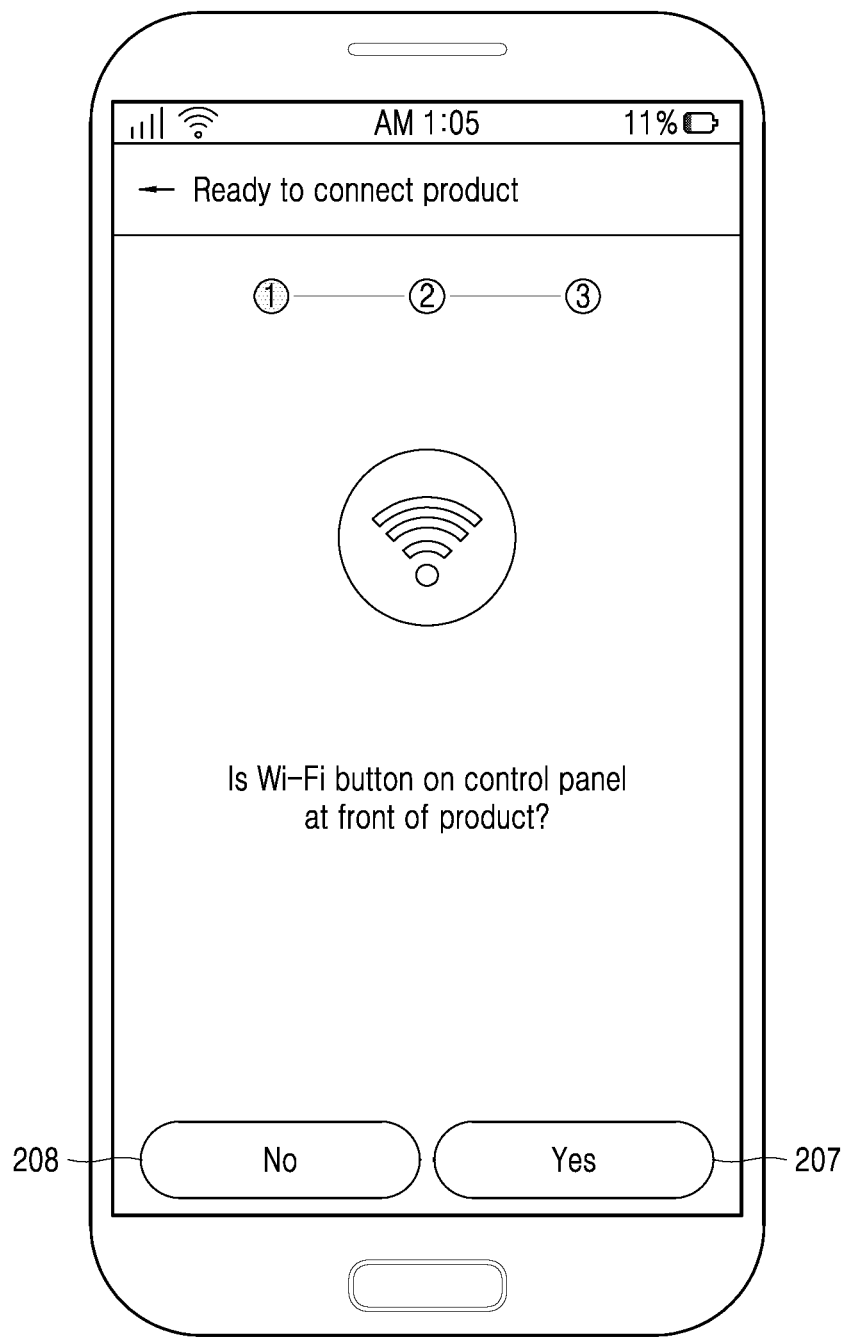
Figure 5:
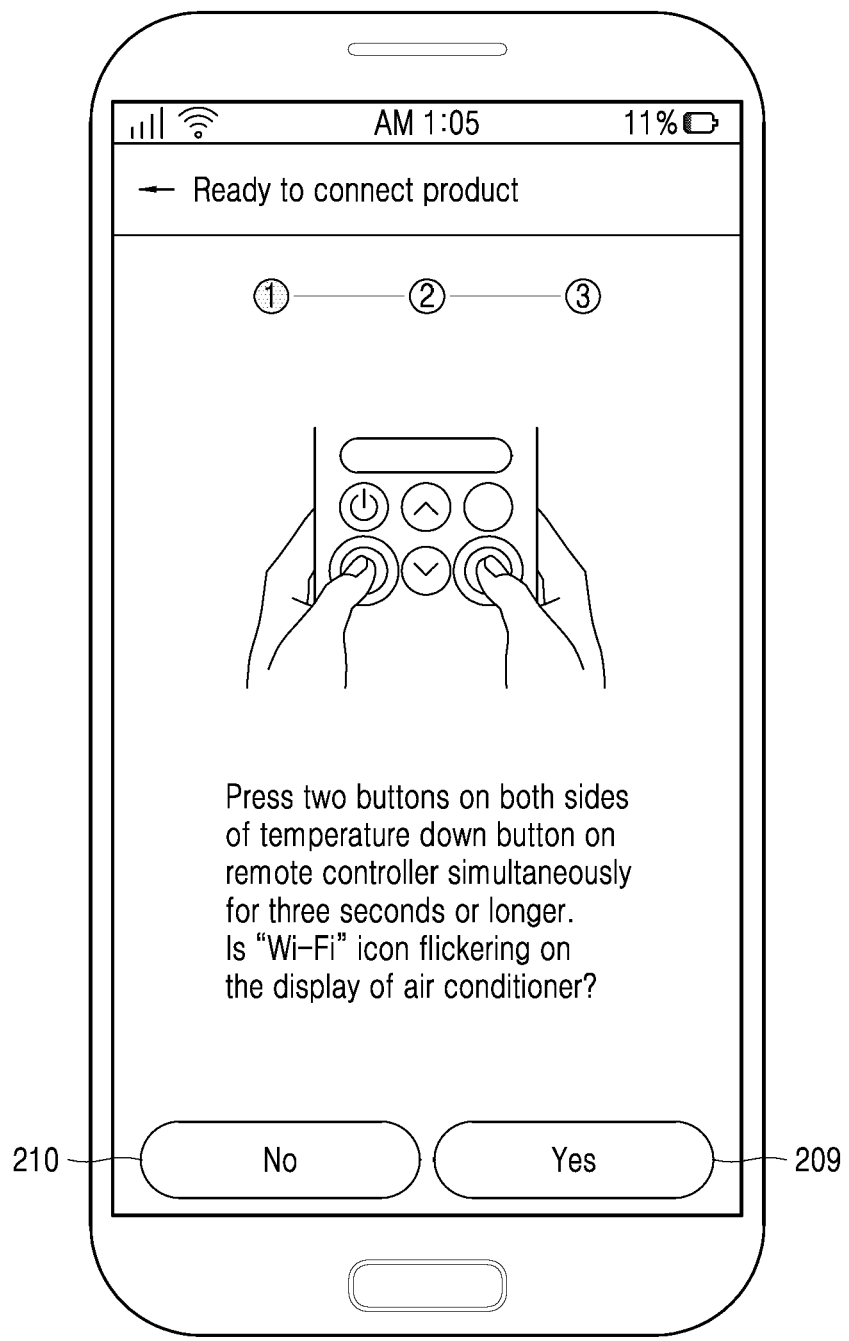
Figure 6:
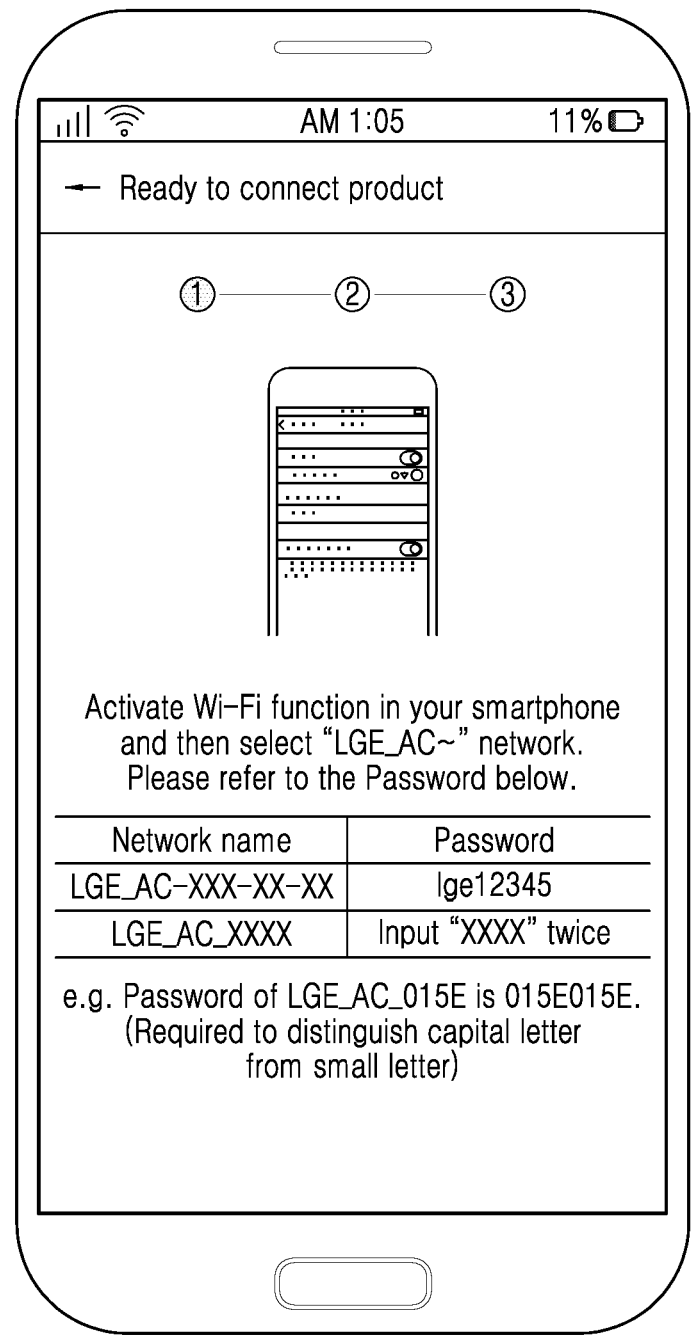
Figure 7:
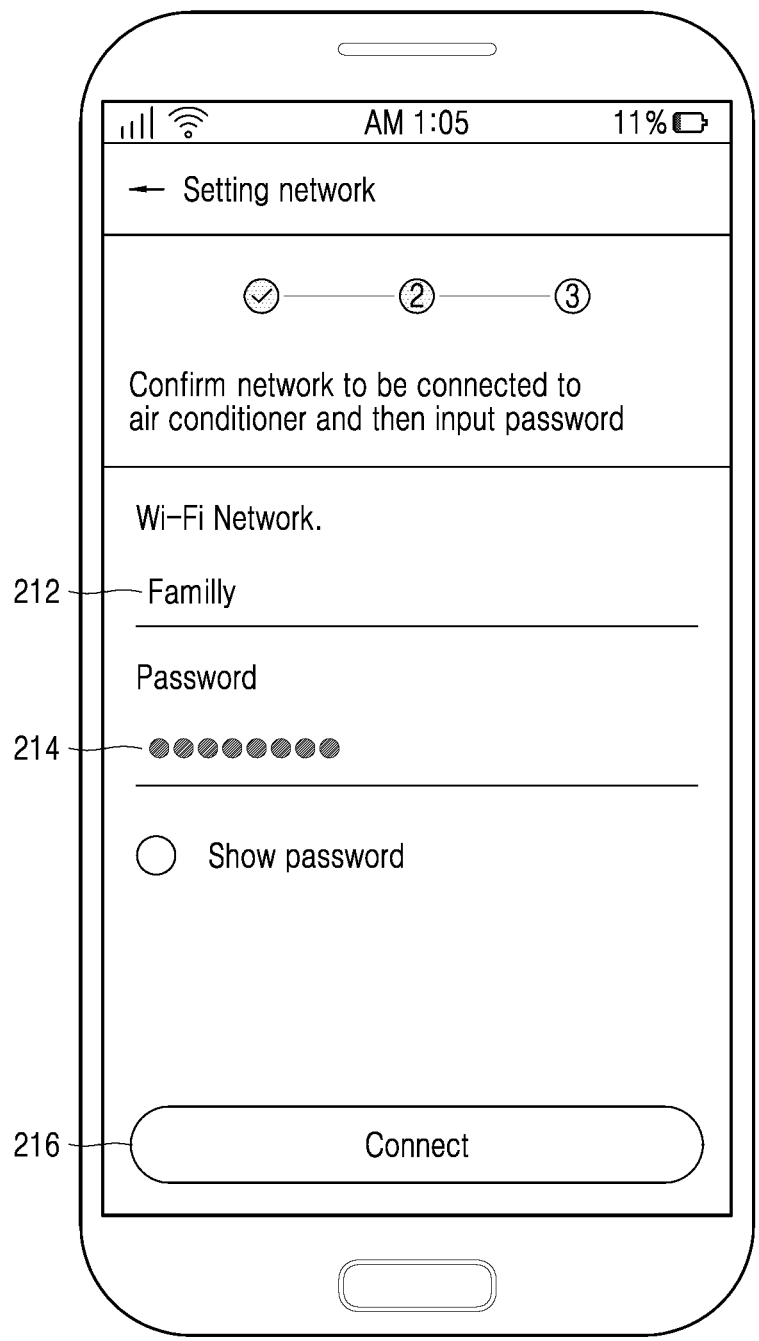
Figure 8:
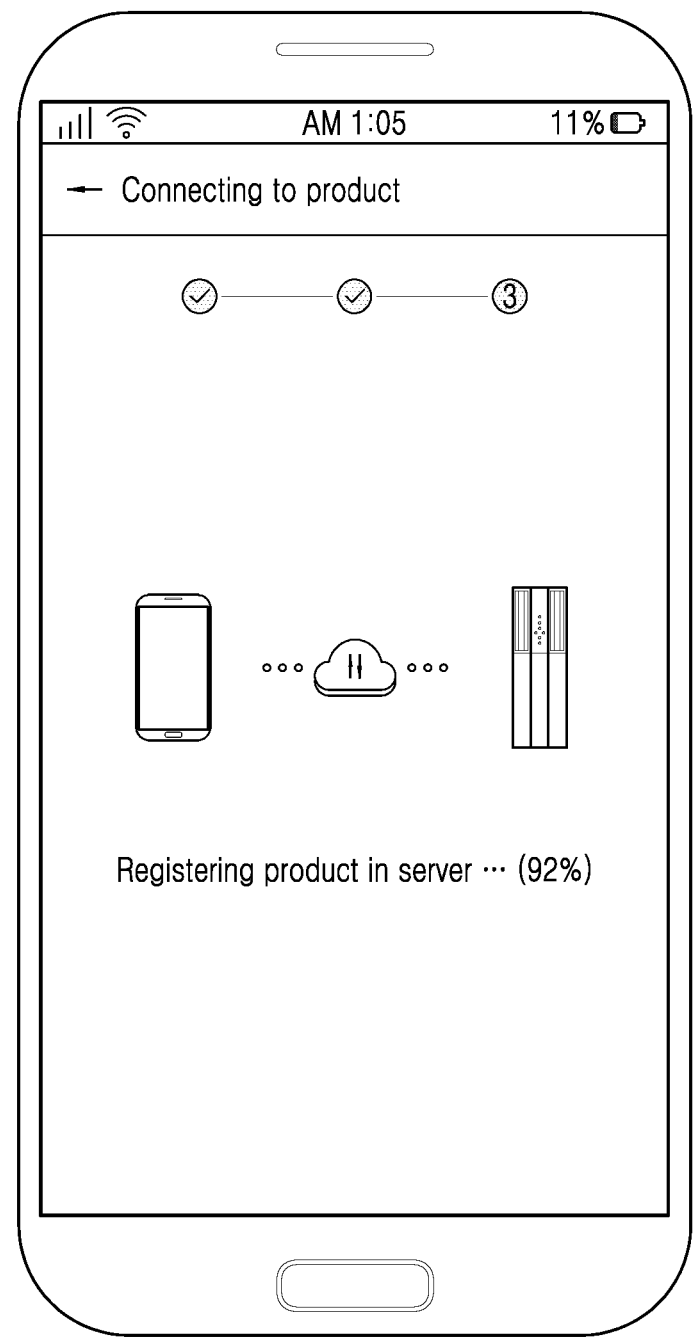
Figure 9:
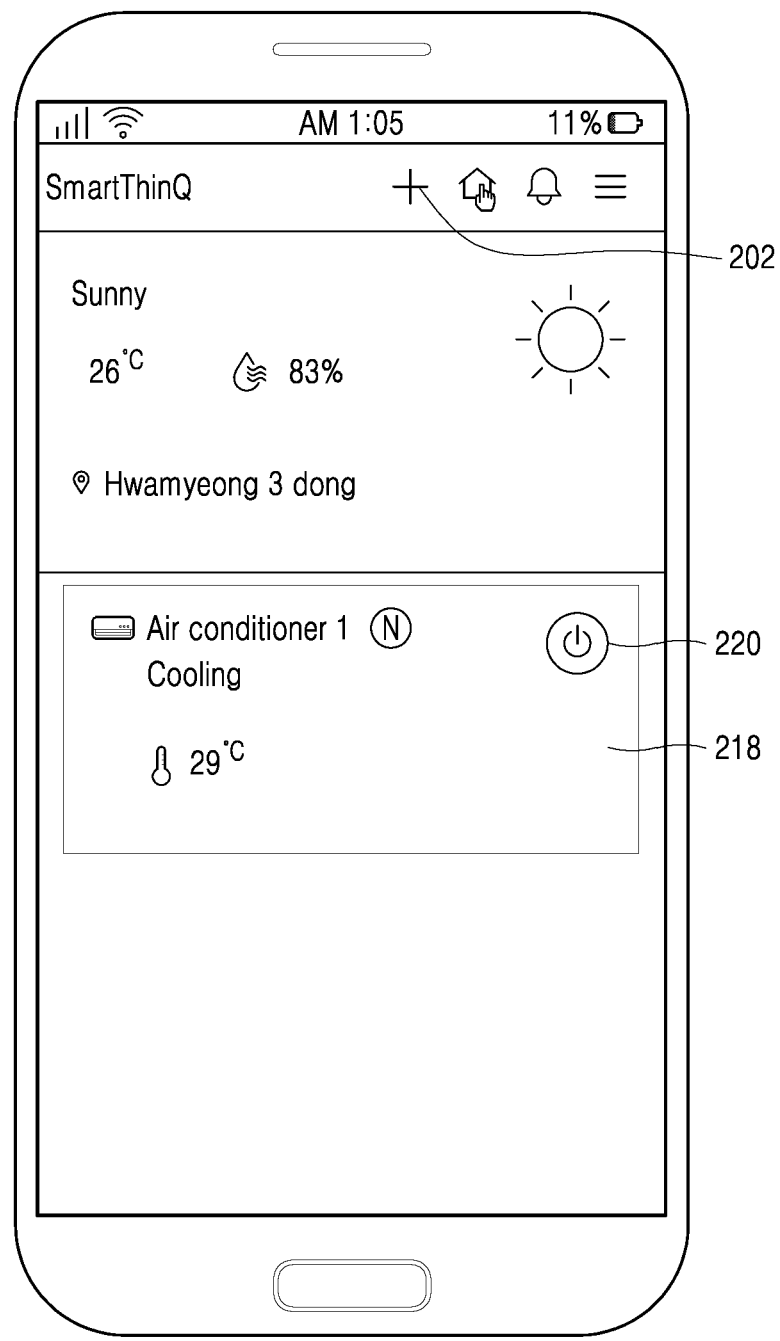

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

Figure 10:
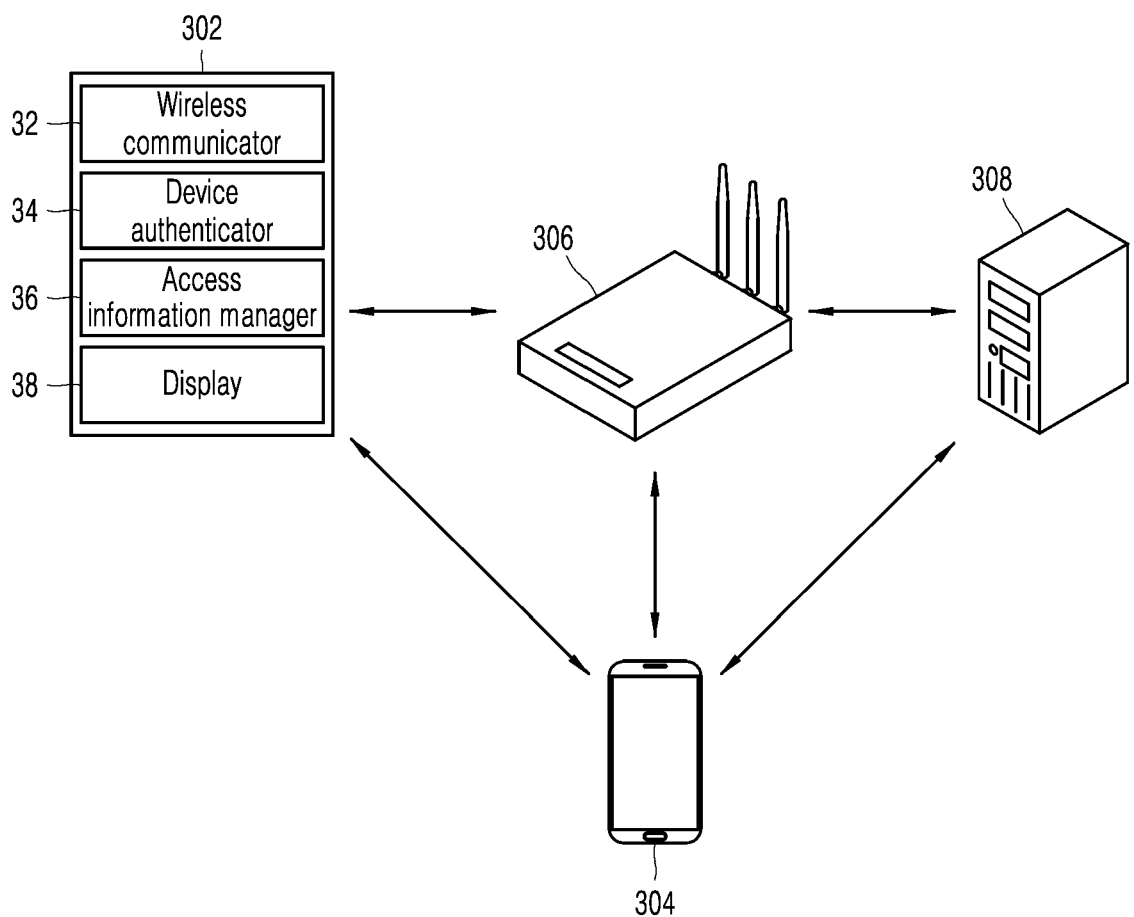
FIG. 10 shows a configuration of a network among an electronic-device managing server, an electronic device, and a user terminal in one embodiment.

FIG. 10 shows a configuration of a network among a server, an electronic device, and a user terminal in one embodiment.

Referring to the drawing, a user may register an electronic device 302 in places such as a house or an office in the user's account, using an application installed on a user terminal 304. The application installed on the user terminal 304 may be used to inquire into information on an operation of the electronic device 302 or control an operation of the electronic device 302. The application installed on the user terminal 304 may be distributed by an electronic-device managing server 308.

The user terminal 304 may be any terminal including a processor for processing an instruction or for calculation, a display for displaying various types of information, a voice input device (e.g., a microphone) capable of receiving a voice input by a user, a voice output device (e.g., a speaker) capable of outputting a voice, and a communication module capable of communicating with other devices. The user terminal 304 may include a mobile terminal such as a smartphone, a tablet, a desktop, a laptop and the like, for example, but not be limited. Hereunder, a smartphone may be given an as example of the user terminal 304 during description of the embodiment.

An access point (AP) 306 may connect to a communication line installed in places such as a house or an office and transmit wireless signals. The user terminal 304 and the electronic device 302 may be disposed in a range where the user terminal 304 and the electronic device 302 receive the wireless signals of the AP 306. The AP 306 may receive the wireless signals transmitted by a device such as the user terminal 304 or the electronic device 302 that is connected to the AP 306 in a communicable manner to transmit the wireless signals outward through the communication line, or may convert signals input from the outside through the communication line into wireless signals to transmit the wireless signals. Accordingly, the electronic device 302 connected to the AP 306 may communicate with the electronic-device managing server 308.

The electronic-device managing server 308 may communicate with the electronic device 302 through an AP 306 installed in a house. The electronic-device managing server 308 may deliver the control instruction input by the user to the electronic device 302 through the AP 306 or request the electronic device 302 to transmit the information on the operation state of the electronic device 302. The electronic device 302 may be controlled under the control instruction input by the user, or may transmit the information on the operation state of the electronic device 302 to the electronic-device managing server 308 through the AP 306.

The electronic-device managing server 308 may transmit the received information on the operation state of the electronic device 302 to the user terminal 304. Through the above process, the user may remotely control the electronic device 302 or confirm the information on the operation state of the electronic device 302 in real time using the user terminal 304.

To perform the above process of managing the electronic device 302, the electronic device 302 needs to be registered in the electronic-device managing server 308 as a device to be managed by the user. Accordingly, in order for the user to manage the electronic device 302 through the application for managing an electronic device 302, a procedure for registering the electronic device 302 in the electronic-device managing server 308 as a device to be managed needs to be performed first.

Referring back to the drawing, the electronic device 302 in one embodiment may include a wireless communicator 32, a device authenticator 34, a data manager 36, and a display 38.

The wireless communicator 32 may perform wireless communication with the user terminal 304 or the electronic-device managing server 308 through a wireless communication module. The wireless communication module may be a Wi-Fi module but not limited, and may be another module enabling wireless communication with an external device. The wireless communicator may also include a wireless communication antenna module such as a Bluetooth module, a NFC-based antenna module or IEEE, ZigBee, 3G (3RD generation), 3GPP (3rd Generation Partnership Project), LTE (Long Term Evolution) and the like that performs communication based on a variety of communication standards, for example. Hereunder, a Wi-Fi module may be given as an example of the wireless communicator in this embodiment.

The wireless communicator 32 may broadcast access information of an electronic device 302 to be registered, when power is supplied to the electronic device 302. The access information of an electronic device 302 to be registered may include device information of the electronic device 302 to be registered. The user terminal 304 may perform communication connection with the electronic device 302 based on the access information of the electronic device 302, received from the wireless communicator 32.

The access information of the electronic device 302 may be a service set identifier (SSID) of the electronic device 302. In one embodiment, the access information of the electronic device 302 may include a password corresponding to the SSID.

The device information of an electronic device 302 to be registered may include at least one of the operation mode, type, model name and identification number of an electronic device to be registered.

The operation mode refers to a method of broadcasting the s SSID of an electronic device when the electronic device operates as a soft access point (Soft AP) using a wireless communicator. The operation mode may include an AT mode and an AD mode.

The AT mode may be a mode in which the electronic device 302 operates in a default mode when the user does not manipulate the electronic device 302. In the AT mode of an SSID broadcast by the electronic device, the user terminal may detect the SSID only when an application provided by the electronic-device managing server 308 is executed, and may inform the user that there is a product to be registered. Thus, when the application is not executed, the user terminal may not inform the user that there is a product to be registered.

The AD mode may be a mode in which the electronic device 302 operates when preset conditions are satisfied. In the AD mode, the wireless communicator may transmit a push message to the user terminal 304 although an application is not executed on the user terminal. The specific conditions preset may differ depending on electronic devices. For example, when specific conditions, such as a condition in which the door of a refrigerator as the electronic device 302 is opened or a condition in which a dishwasher as the electronic device 302 is supplied with power, and the like, are satisfied as a result of an act of the user, the wireless communicator may operate in the AD mode. In this case, the wireless communicator 32 may transmit a push message, indicating that there is an electronic device to be registered, to the user terminal 304 although the user does not use the application.

Specific conditions and operation time for the AD-mode operation of electronic devices may be set in advance depending on each product family. Specifically, the electronic devices may operate in the AT mode constantly, and when the specific conditions preset are satisfied as a result of an act of the user, may operate in the AD mode for a predetermined period of time.

Suppose that the electronic device is a refrigerator. The refrigerator operates in the AT mode, and then when the user opens the door of the refrigerator, the refrigerator may operate in the AD mode for 15 minutes. In this case, although the application on the user terminal is not executed, the wireless communicator may transmit a push message, indicating there is an electric device to be registered, to the user terminal. Accordingly, the user may recognize the electronic device to be registered and may be encouraged to register the electronic device to be registered. After the predetermined period of time, the mode of the electronic device may change from the AD mode to the AT mode again.

Each electronic device may provide its SSID in a different operation mode depending on a product family of the electronic device or depending on whether specific conditions are satisfied even in the same product family. That is, when the electronic device operates in the AT mode, an SSID broadcast by the electronic device (e.g., an air conditioner) may be "AT_AIRCON", and when the electronic device operates in the AD mode, an SSID broadcast by the electronic device (e.g., an air conditioner) may be "'AD_AIRCON". When the electronic device operates in the AD mode during the process of registering the electronic device, the user terminal may inform the user that there is an electronic device to be registered using a push message.

A product family of an electronic device to be registered may include all types of home appliances such as a washing machine, a vacuum cleaner, a refrigerator, an air conditioner, a dishwasher and the like that are used at home or all types of electronic devices that are provided therein with an electronic circuit, operate under the electronic control and are registered in the electronic-device managing server 308.

In one embodiment, the SSID of the electronic device 302 may set differently for each product family of the electronic device 302. For example, when the electronic devices 302 belong to the product family of air conditioner and operate in the AT mode, the air conditioners may be given the same SSID, e.g., "'AT_AIRCON"', regardless of the types (a standing air conditioner or a wall-mounted air conditioner) or the product models of the air conditioners. In another example, a standard version of refrigerators or a high-end version of refrigerators may all be given the same SSID, e.g., "AT_REFRIG".

The model name may be a combination of numbers or characters assigned in advance to identify each of the product family and types of electronic devices. In the case of an air conditioner, a standing air conditioner having a model name of "A82" and operating in the AT mode may be given an SSID of "AT_AIRCON_A82", and a wall-mounted air conditioner having a model name of "B24" and operating in the AT mode may be given an SSID of "AT_AIRCON_B24" that is different from the SSID of "AT_AIRCON_A82". Additionally, the same type of standing air conditioners may have a different model name depending on their release dates and their product grades.

The identification number may be a combination of numbers or characters, which is unique to each electronic device and may be used to distinguish the electronic device from another electronic device. Accordingly, the same type of electronic devices, and electronic devices having the same model name may have different identification numbers. The identification number may be a MAC address or a serial number, and may be a different value for each device to be registered. For example, standing air conditioners having the same model name (A82) may have different identification numbers. Accordingly, each of the standing air conditioners operating in the AT mode may respectively have an SSID of "AT_AIRCON_A82_E015", "AT_AIRCON_A82_E583", "AT_AIRCON_A82_E599" and the like that are different from one another.

The wireless communicator 32, as described above, may broadcast an SSID of an electronic device 302 to be registered, including information on the operation mode, product family, model name and identification number of the electronic device 302. Accordingly, the user may recognize the type of the electronic device only with the SSID of the electronic device 302 and readily register the electronic device.

Additionally, the wireless communicator 32 may broadcast the SSID of the electronic device 302 constantly without the user's additional manipulation. Accordingly, the user may register the electronic device as an electronic device to be managed in a user account based on a simple manipulation and a small number of manipulations.

The device authenticator 34 may ascertain whether the electronic device 302 connected to the user terminal 304 in a communicable manner is a device the user wants to register, and may generate device authentication information. Specifically, when the user terminal 304 connects to the electronic device 302 in a communicable manner using the SSID, the device authenticator 34 may request the user terminal to confirm the device and request a display 38 to generate a confirmation signal. When receiving the confirmation information in relation to the request for confirmation of the device from the display, the device authenticator 34 may generate device authentication information.

The display 38 may display a variety of operation states of the electronic device 302. The display 38 may be provided with a liquid crystal display (LCD), a plasma display panel (PDP), a Light emitting diode (LED), an organic light emitting diode (OLED) and the like, and may include a means of input such as a button, a keypad or a touch pad.

The display 38 may allow a lamp of the display to flicker or output a notification sound periodically to generate a confirmation signal in response to the request for generation of a confirmation signal. Further, when the display generates a confirmation signal in response to the request for confirmation of the device, transmitted to the user terminal, the user may manipulate the device through the means of input of the display 38. Under the assumption that a flicker of the lamp of the display denotes a request for generation of a confirmation signal, the user may confirm the flicker of the lamp in response to the request for confirmation of the device, and then press the button on the display 38 of the electronic device 302 to respond to the request for confirmation of the device.

Even when the electronic device 302 directly broadcasts the SSID, an electronic device in a neighbor's house, or an electronic device unintended may connect to the user terminal 304 due to the structure in a house, disposition of the electronic device 302, interference with an SSID of another electronic device, or the user's mistake and the like. Accordingly, the user may ascertain whether a device that is to be registered and that the user wants to connect connects to the user terminal correctly based on the request for confirmation of the device, the user's response to the request for confirmation of the device, and the generation of the device authentication information.

The data manager 36 may transmit identification information of the electronic device to the electronic-device managing server 308 at the same time as the wireless communicator 32 requests registration of the device in the user account stored in the electronic-device managing server 308. The identification information of the electronic device 302 may include information such as its model name, its model number, and its serial number. The electronic device 302 may be registered in the user account stored in the electronic-device managing server when the access information of the device does not correspond to an exceptional case in the electronic-device managing server 308. One or more electronic devices may belong to a single user account.

The exceptional case may include all cases related to disruption in wireless communication such as a case where AP access information is input incorrectly, a case where standby time for registration of the electronic device exceeds predetermined time since the user does not make any response to the request for confirmation of the device, a case where a communication error occurs in the electronic-device managing server 308, and the like. If the exceptional case occurs, the electronic device 302 may not be registered and undo communication connection with the user terminal. During the AD-mode operation in the exceptional case, the mode of the electronic device 302 may change to the AT mode while the electronic device 302 undoes communication connection with the user terminal.

According to the present disclosure, electronic devices belonging to the same product family may respectively have a different SSID. In the related art, electronic devices belonging to the same product family (e.g. an air conditioner, a washing machine, a clothes dryer, a refrigerator and the like) have the same SSID. When the user confirms the specific features or the product model of an electronic device incorrectly, the electronic device may not communicate, and registration of the electronic device may fail. According to the present disclosure, the user may readily distinguish different SSIDs of electronic devices, and without the user's manipulation, the SSID of an electronic device to be registered may be automatically detected and the electronic device may be easily registered. Thus, the registration of the electronic device is less likely to fail.

FIGS. 11 to 18 respectively show a screen on a display of a user terminal during a process of registering an electronic device in one embodiment. FIG. 19 is a flow chart showing a method for registering an electronic device in one embodiment. Hereinafter, a method for registering an electronic device in the embodiment is described with reference to FIGS. 11 to 19.

The user may execute an application for managing an electronic device installed on the user terminal 304. Though not illustrated, the user may input user account information of the user when executing the application for the first time.

Figure 11:
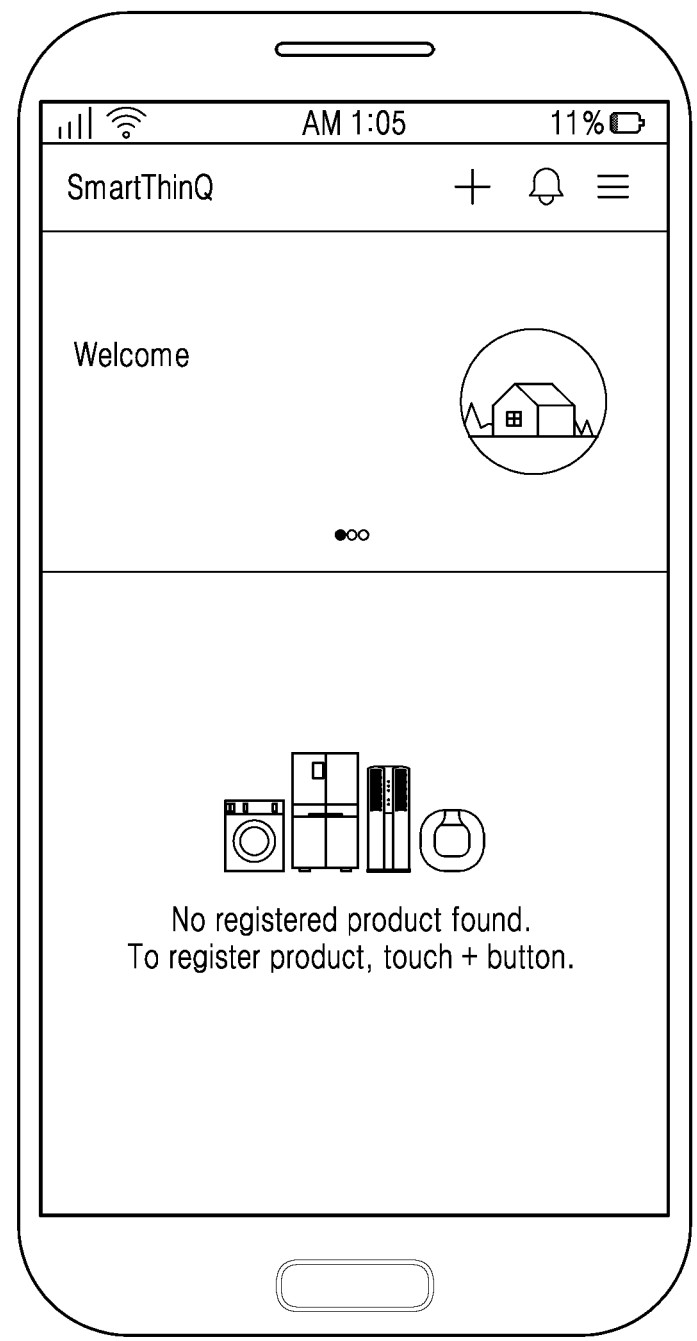
FIGS. 11 to 18 respectively show a screen on a display of a user terminal during a process of registering an electronic device in one embodiment.

As a result of execution of the application for managing an electronic device by the user, an initial screen in FIG. 11 may be displayed on the screen of the user terminal 304. When there is no product registered after the execution of the application for managing an electronic device, a message indicating that no product is registered may be displayed as in FIG. 11.

The user terminal 304 may detect SSIDs of the electronic device 302, broadcast by the wireless communicator 32 of the electronic device 302 (502), and display a list of the detected SSIDs of the electronic device on the display screen of the user terminal 304 to provide the list to the user (504).

Figure 12:
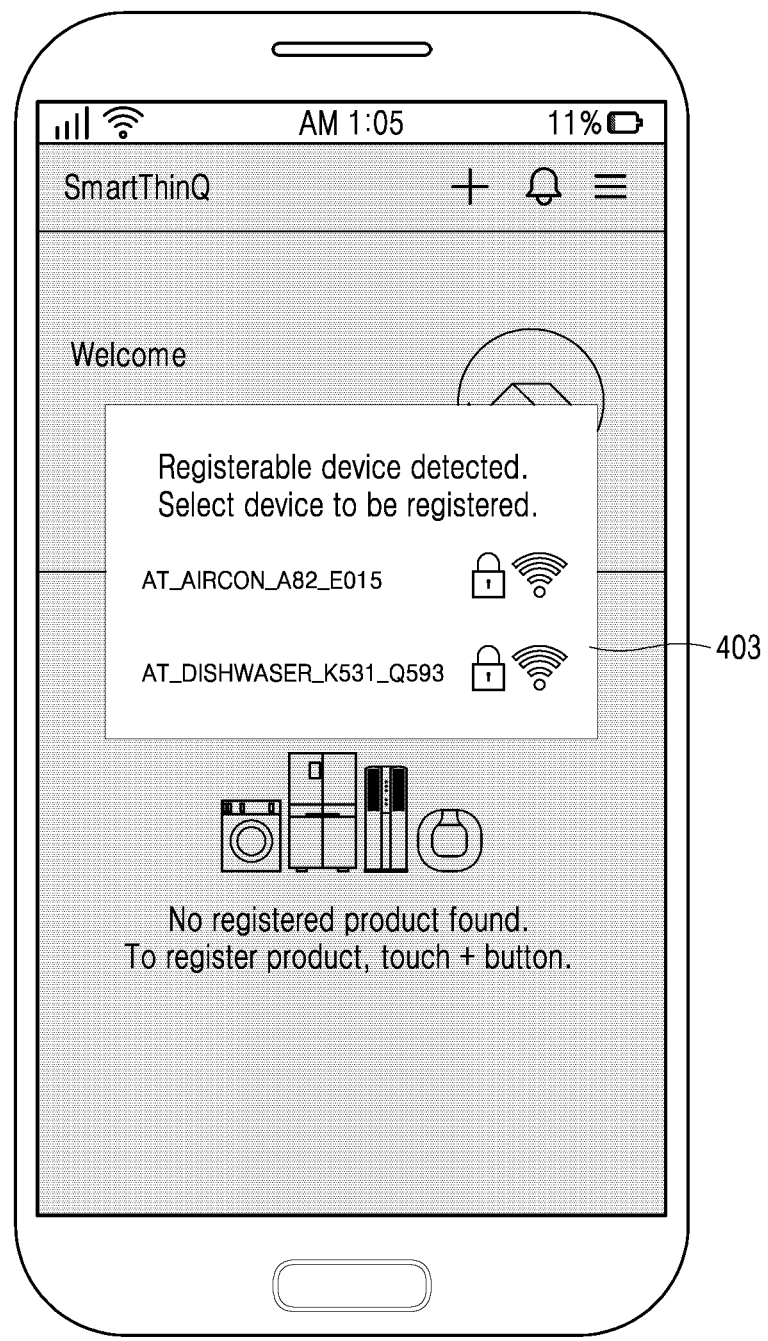

As illustrated in FIG. 12, there may be a plurality of detected SSIDs of the electronic device, and the plurality of SSIDs may all be displayed on the screen of the user terminal.

In this case, as long as the user executes the application provided by the electronic-device managing server 308, the SSIDs of the electronic device may be broadcast without any manipulation, and the user terminal 304 may detect the SSIDs of the electronic device in real time. Accordingly, the electronic device may readily connect although the user is not aware about the model name or the product number of the electronic device.

Referring to an SSID popup window 403 in FIG. 12, an SSID ("AT_AIRCON_A82_E015") of an air conditioner, and an SSID ("AT_DISHWASER_K531_Q593") of a dishwasher may be displayed on the display of the user terminal. The user may press "AT_AIRCON_A82_E015" to register the air conditioner when the user wants to register the air conditioner. Even though the user is not aware about the model name or the product number of the air conditioner, the user may recognize "AT_AIRCON_A82_E015" as the SSID of the electronic device the user wants to register.

Figure 13:
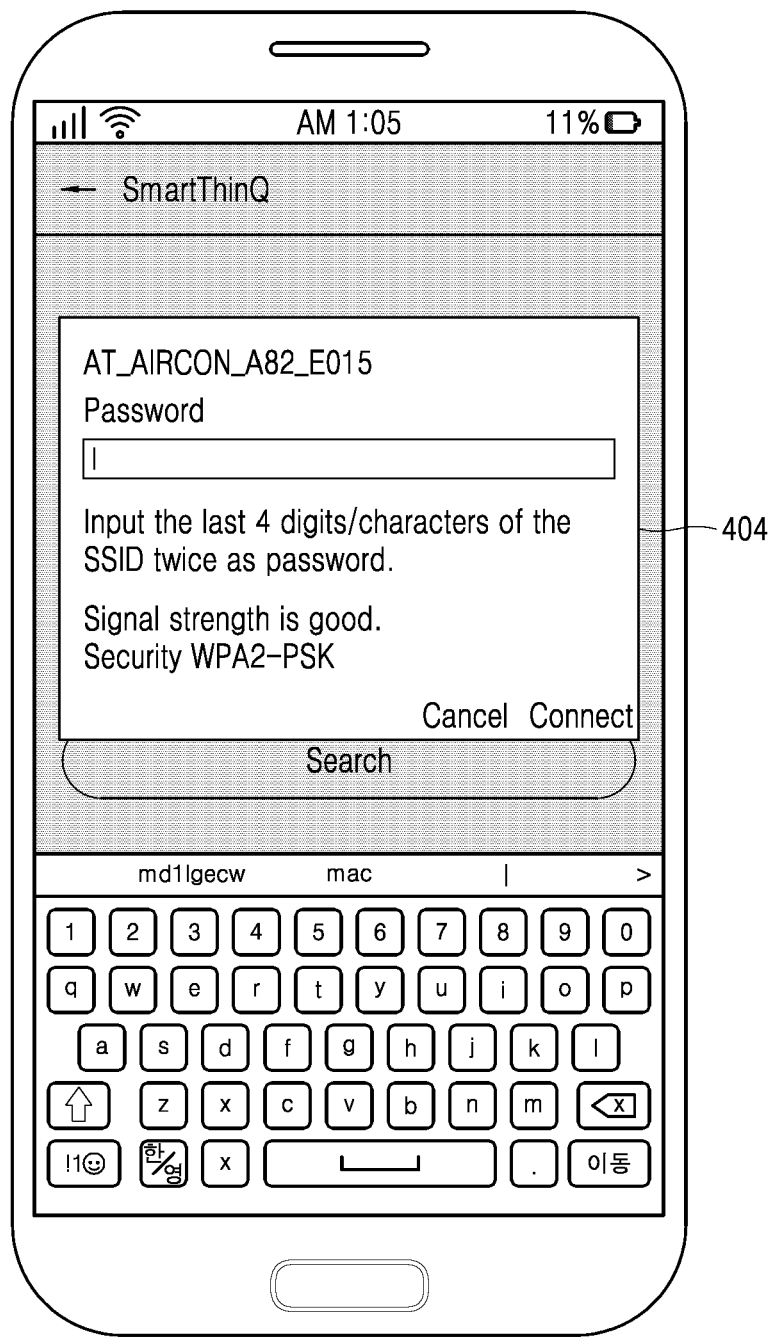

In one embodiment, access information of the electronic device 302 may include a password corresponding to the SSID. FIG. 13 shows a screen displayed on the screen of the user terminal when the user presses "AT_AIRCON_A82_E015" in FIG. 12.

Referring to a password popup window 404 in FIG. 13, the user may input the password based on a guide on the screen. For example, the password of the SSID 'AT_AIRCON_A82_E015' is 'E015E015', which is a character in which the last four digits and letters of the SSID are repeated twice. Accordingly, the user may input "E015E015" as the password (506).

Then when the wireless communicator 32 receives information on a selection of the SSID of the electronic device and a request for communication with the electronic device from the user terminal 304 (508), the device authenticator 34 may request the user terminal 304 to confirm the device (510) and may request the display 38 to generate a confirmation signal (512).

The display 38 may allow the lamp of the display to flicker, or output a notification sound on a regular basis to generate the confirmation signal in response to the request for generation of a confirmation signal (513). Further, the user may manipulate the device using a means of input of the display 38 after the display generates the confirmation signal according to an instruction in response to the request for confirmation of the device, transmitted to the user terminal (514).

Figure 14:

Referring to FIG. 14, a flicker of the lamp of the display of the electronic device may denote the request for generation of a confirmation signal, and "Press the Wi-Fi button on the front surface of the product." may denote the request for confirmation of the device, transmitted to the user terminal. Accordingly, the user may ascertain the flicker of the LED in response to the request for confirmation of the device, and then may press the Wi-Fi button of the display 38 of the electronic device 302 to respond to the request for confirmation of the device (516).

When receiving the response to the request of confirmation of the device, the display 38 may deliver confirmation information to the device authenticator 34 (518), and the device authenticator 34 may generate device authentication information on the electronic device based on the confirmation information (520).

The user may ascertain whether the device that is to be registered and that the user wants to connect connects to the user terminal correctly based on the request for confirmation of the device, the user's response, and the generation of device authentication information.

The device authenticator 34 may deliver the generated device authentication information to the data manager 36

Figure 15:
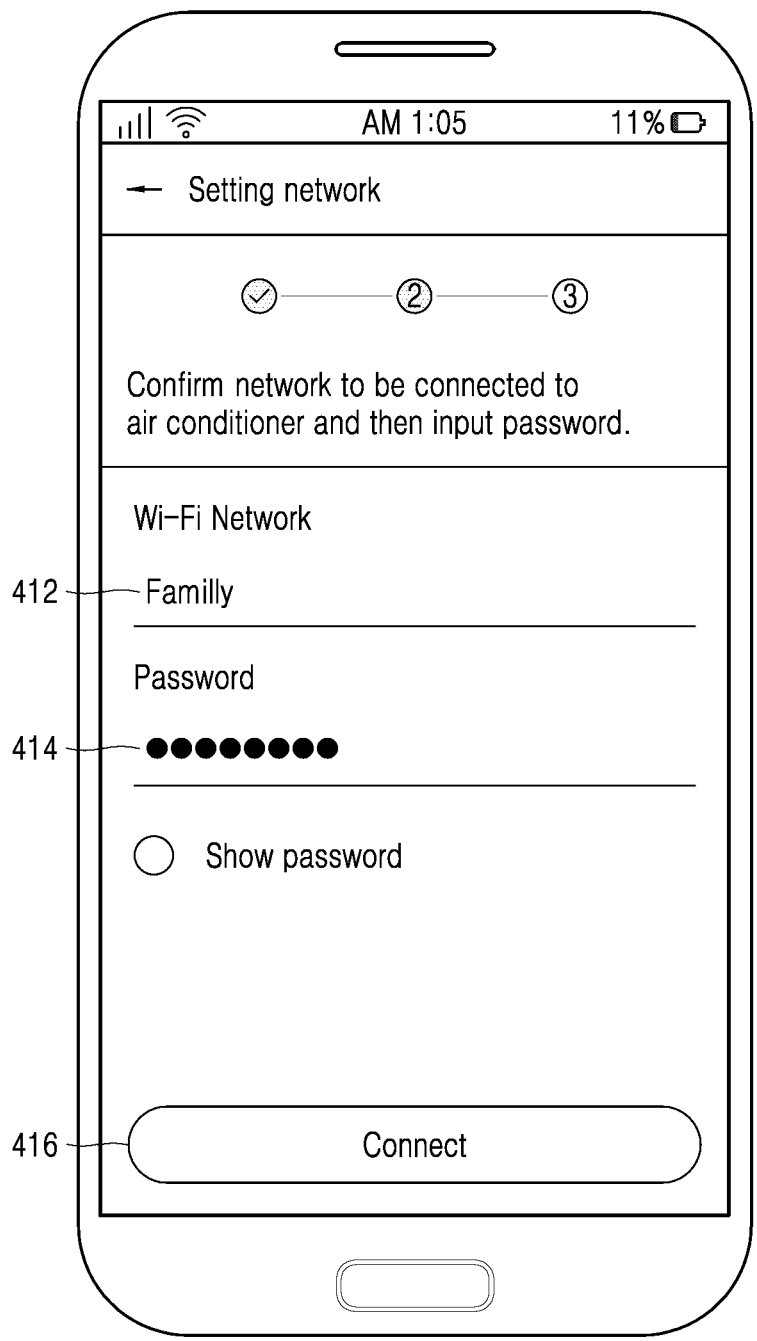
Figure 16:
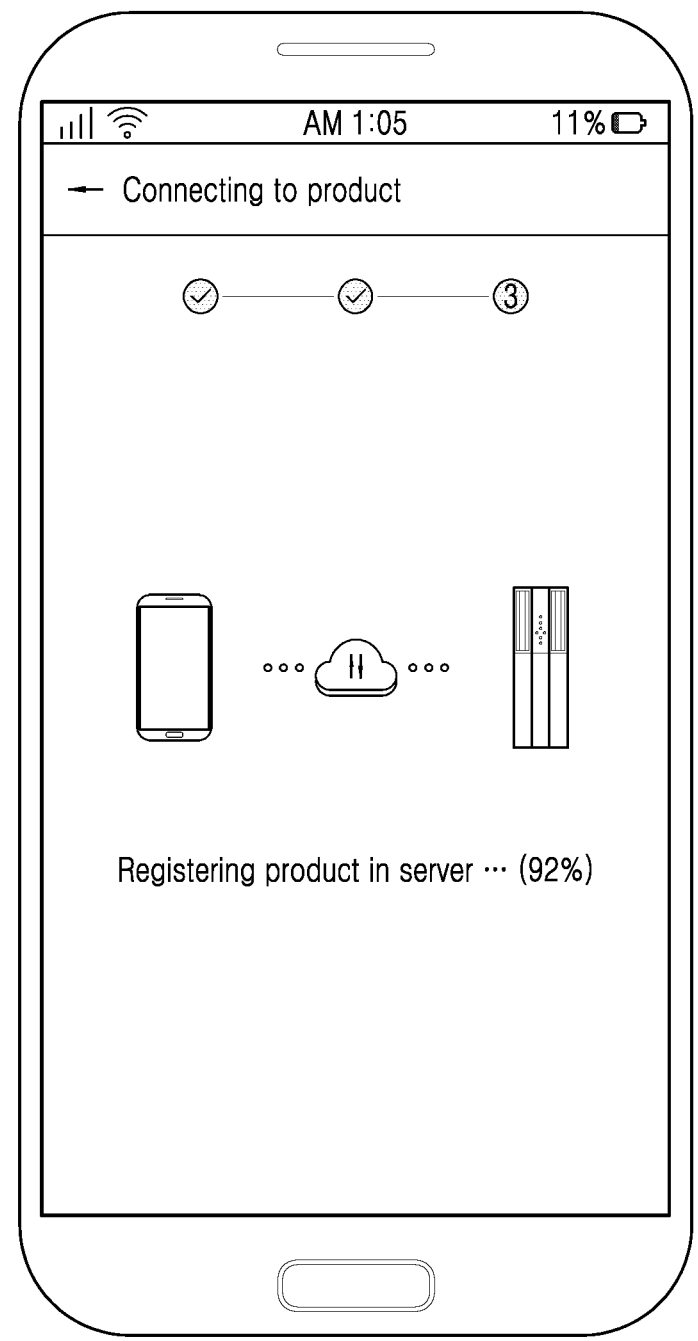

(522), and the data manager 36, as illustrated in FIG. 15, may make a request for AP access information to the user terminal 304 (524).

The user may respectively input a SSID 412 and a password 414 of an access point (528) in response to the user terminal 304's request for input of AP access information (526). As a result of input of the access information of the AP 306 and pressing of a connection button 416 by the user, the user terminal 304 may deliver the access information of the AP 306 to the data manager 36 (530).

Then the data manager 36 may make a request for communication connection to the electronic-device managing server 308 while transmitting the AP access information and the identification information of the electronic device to the wireless communicator 32 (532), and the wireless communicator 32 may attempt to communicate with the electronic-device managing server 308 based on the AP access information of the data manager 36 (533). In this case, as a result of communication with the electronic-device managing server 308, the wireless communicator 32 may make a request for registration of the electronic device to be registered in the user account (534).

Figure 17:
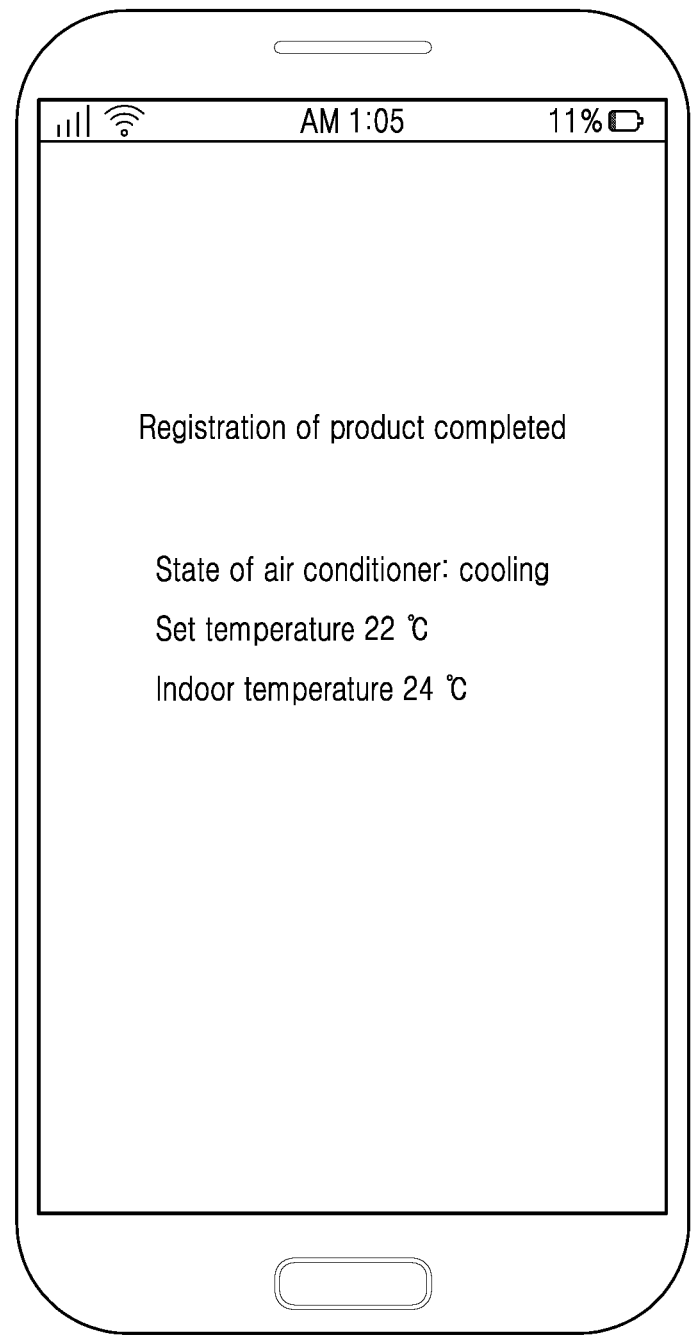

The identification information of the electronic device may include information on the model name, the model number, and the serial number of the electronic device. When the identification information of the electronic device 302 does not correspond to an exceptional case in the electronic-device managing server 308, the electronic device 302 may be registered in the user account stored in the electronic-device managing server 308 after standby time for registration, as in FIG. 16 (536). When the electronic device is registered in the user account of the electronic-device managing server, the electronic-device managing server 308, as illustrated in FIG. 17, may inform the user that the electronic device is registered, through the user terminal 304 (538).

The exceptional case may include a case where AP access information is input incorrectly, a case where standby time for registration of the electronic device exceeds predetermined time since the user does not make any response to the request for confirmation of the device, a case where a version of the electronic device does not match a version used by the electronic-device managing server, a case where a communication error occurs in the electronic-device managing server 308, and the like. In the exceptional case, the electronic device 302 may not be registered and undo communication connection with the user terminal. During the AD-mode operation in the exceptional case, the mode of the electronic device 302 may change to the AT mode while the electronic device 302 undoes communication connection with the user terminal.

Figure 18:
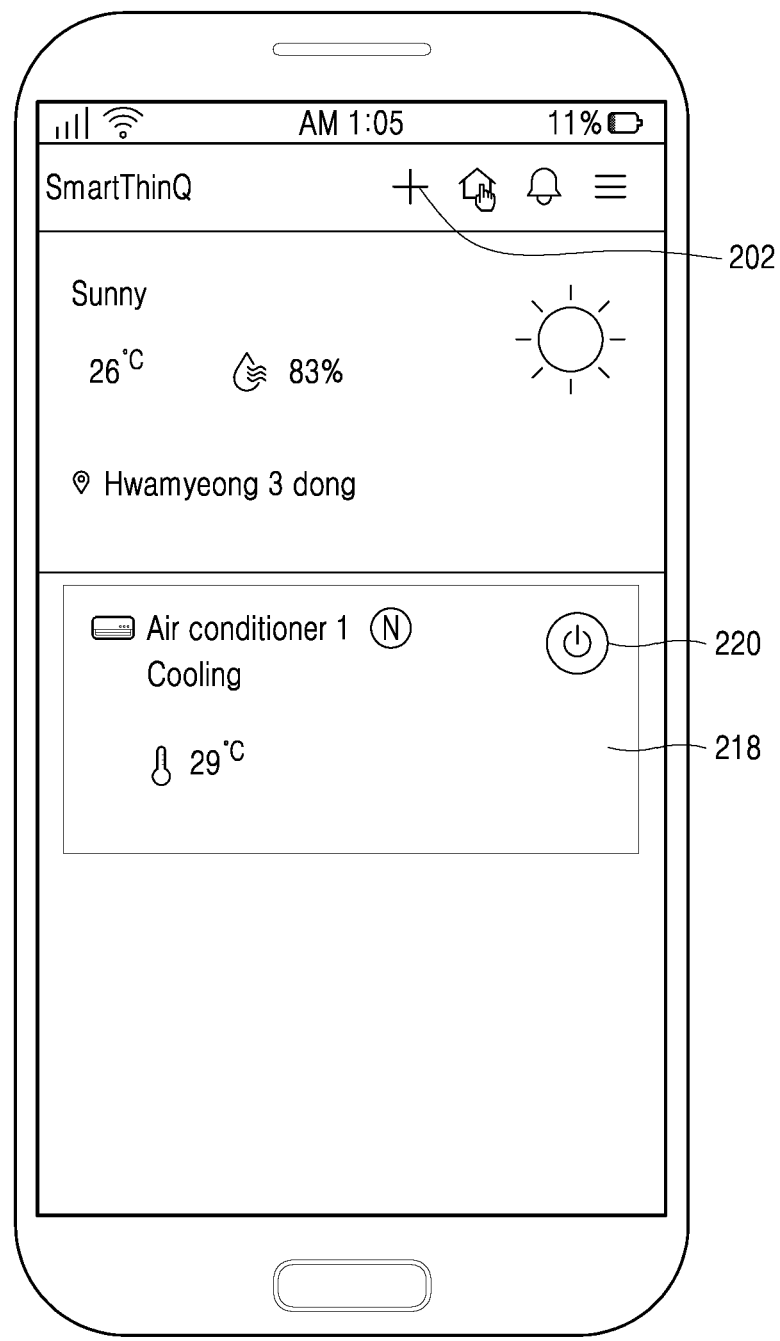
Figure 19:
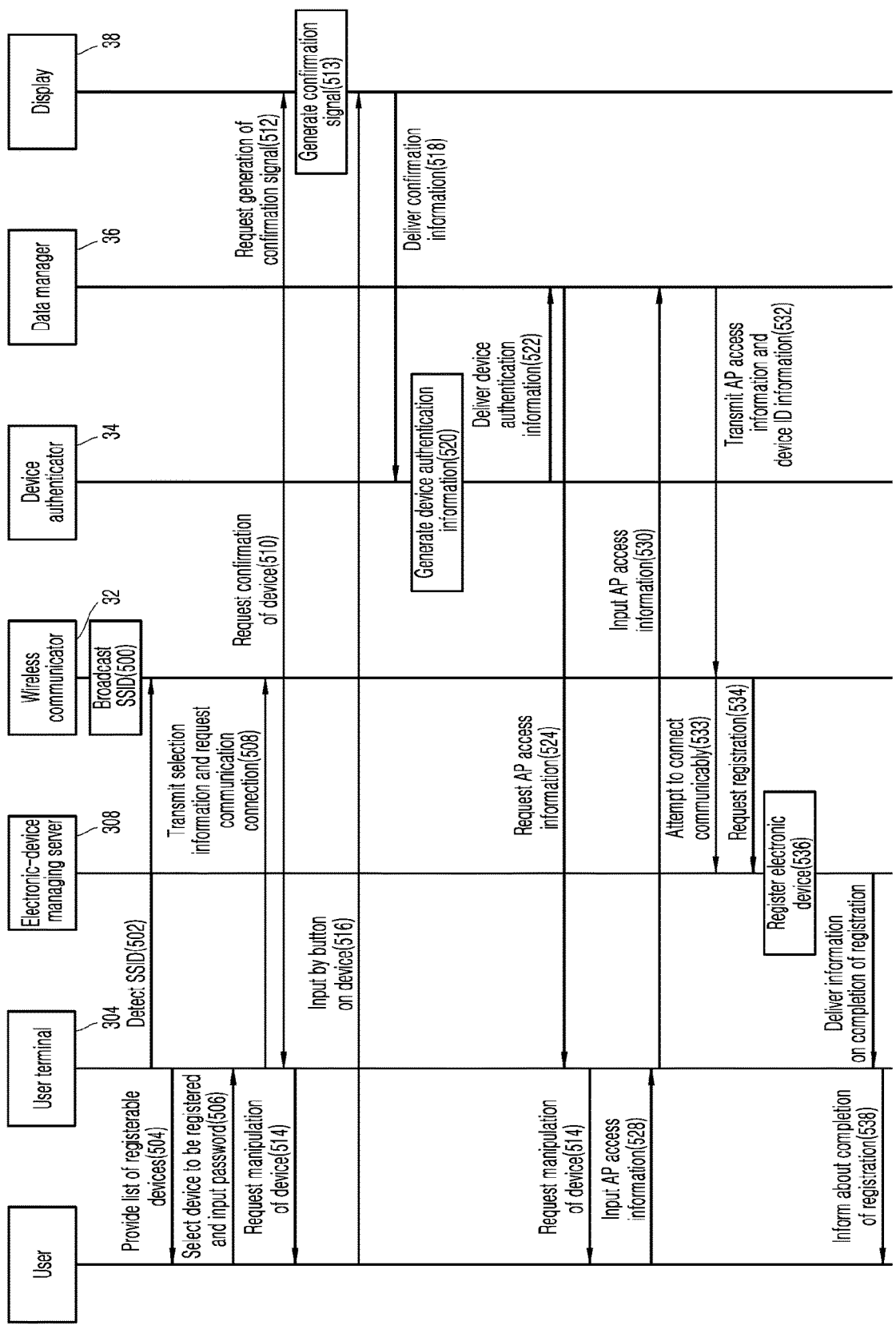
FIG. 19 is a flow chart showing a method for registering an electronic device in one embodiment.

FIG. 18 shows an initial screen displayed on the use terminal 304 after completion of registration of the electronic device 302. An inquiry tab 418 for inquiring into information on the electronic device 302 registered or controlling the electronic device 302 registered may be displayed on the initial screen. A power button 420 for powering on or off the electronic device 302 and information (cooling, 29° C.) on an operation of the electronic device 302 may be respectively displayed on the inquiry tab 418. The user may press a registration button 402 on the initial screen to register another electronic device additionally, and when an SSID of another electronic device is detected, the use terminal may detect the SSID and provide a list of devices to be registered to the user.

In the above-described embodiment, since the wireless communicator 32 of the electronic device may broadcast the SSID of the electronic device without the user's additional manipulation, the user may register the electronic device only by selecting the detected SSID. Thus, from the user's perspective, the electronic device 302 may be registered with a simple manipulation and a small number of manipulations, thereby reducing time spent on registering the electronic device 302.

In the embodiment, the electronic device may broadcast the identification information of the electronic device, including various types of information. Thus, communication connection may be readily performed between the electronic device and the user terminal despite the user's lack of knowledge about features of the electronic device 302, and the registration of the electronic device 302 may be less likely to fail.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

The invention claimed is:

1. A method for registering an electronic device, comprising:
   broadcasting access information of the electronic device to be registered including device information of the electronic device to be registered;
   receiving a request for communication connection based on the broadcast access information of the electronic device from a user terminal;
   transmitting a request for confirmation of a device corresponding to the received request for communication connection to the user terminal;
   generating a confirmation signal to request a manipulation at the electronic device by a user to confirm the electronic device to be registered;
   receiving device confirmation information from the user terminal as a result of the manipulation at the electronic device by the user;
   generating device authentication information based on the confirmation information;
   receiving access point (AP) access information from the user terminal;
   performing communication connection with an electronic-device managing server based on the received AP access information while transmitting identification information of the electronic device; and
   requesting registration of the device in a user account stored in the electronic-device managing server based on the transmitted identification information of the electronic device,
   wherein the device information of the electronic device to be registered comprises information on an operation mode, type, model name and identification number of the electronic device to be registered,
   wherein the user terminal is configured to detect the access information, to provide a list of detected access information to the user and to transmit, to the electronic device, information on a selection of the access information by the user and the request for communication connection,
   wherein the operation mode comprises an AT mode and an AD mode, wherein in the AT mode, the user terminal is configured to inform the user that there is a product to be registered when an application for the registration of the electronic device is executed in the user terminal, and wherein in the AD mode, the user terminal is configured to inform the user that there is a product to be registered when a preset condition of the electronic device is satisfied.

2. The method of claim 1, wherein the identification number is differently set for each device to be registered.

3. The method of claim 1, wherein the broadcasting access information of the electronic device to be registered comprises operating in the AT mode and then when preset conditions are satisfied, operating in the AD mode for a predetermined period of time.

4. The method of claim 1, wherein the transmitting of the request for confirmation of the device corresponding to the received request for communication connection to the user terminal comprises generating the confirmation signal while transmitting a request for confirmation of a device to the user terminal.

5. The method of claim 4, wherein the receiving of the device confirmation information as the result of the manipulation by the user comprises receiving the device confirmation information based on the user's input of a button corresponding to the generated confirmation signal.

6. An electronic device, comprising:

a wireless communicator configured to broadcast access information of the electronic device to be registered including device information of the electronic device to be registered, and to receive a request for communication connection based on the broadcast access information of the electronic device from a user terminal;

a display configured to generate a confirmation signal to request a manipulation at the electronic device by a user to confirm the electronic device to be registered;

a device authenticator configured to transmit a request for confirmation of a device corresponding to the received request for communication connection to the user terminal, to receive device confirmation information from the user terminal as a result of the manipulation at the electronic device by the user, and to generate device authentication information based on the confirmation information; and a data manager configured to receive AP access information from the user terminal, to transmit identification information of the electronic device through the wireless communicator based on the received AP access information, to perform communication connection with an electronic-device managing server, and to request registration of the device in a user account stored in the electronic-device managing server based on the transmitted identification information of the electronic device, wherein the device information of the electronic device to be registered comprises information on an operation mode, type, model name and identification number of the electronic device to be registered, wherein the user terminal is configured to detect the access information and to provide a list of detected access information to the user, wherein the operation mode comprises an AT mode and an AD mode, wherein in the AT mode, the user terminal is configured to inform the user that there is a product to be registered when an application for the registration of the electronic device is executed in the user terminal, and wherein in the AD mode, the user terminal is configured to inform the user that there is a product to be registered when a preset condition of the electronic device is satisfied.

7. The electronic device of claim 6, wherein the identification number is differently set for each device to be registered.

8. The electronic device of claim 7, wherein the wireless communicator operates in the AT mode and then when preset conditions are satisfied, the wireless communicator is to operate in the AD mode for a predetermined period of time.

9. The electronic device of claim 6, wherein the electronic device comprises the display configured to generate the confirmation signal when the request for confirmation of the device is transmitted to the user terminal.

10. The electronic device of claim 9, wherein the receiving of the device confirmation information from the user terminal as the result of the manipulation by the user comprises receiving the device confirmation information based on the user's input using a button of the display which corresponds to the generated confirmation signal.

* * * * *